United States Patent [19]

Waldman

[11] Patent Number: 5,168,517
[45] Date of Patent: Dec. 1, 1992

[54] APPARATUS AND METHODS FOR SELECTIVELY FORWARDING TELEPHONE CALLS

[76] Inventor: Herbert Waldman, 1739 52nd St., Brooklyn, N.Y. 11204

[21] Appl. No.: 322,217

[22] Filed: Mar. 13, 1989

[51] Int. Cl.⁵ .................... H04M 1/64; H04M 1/66; H04M 3/54; H04M 3/56
[52] U.S. Cl. .................... 379/67; 379/199; 379/205; 379/211
[58] Field of Search ............ 379/211, 212, 210, 205, 379/58, 63, 67, 199, 88

[56] References Cited

U.S. PATENT DOCUMENTS

| | | | |
|---|---|---|---|
| 4,086,438 | 4/1978 | Kahn et al. | 379/158 |
| 4,720,853 | 1/1988 | Szlam | 379/211 |
| 4,724,539 | 2/1988 | Hisher | 379/205 |
| 4,783,796 | 11/1988 | Ladd | 379/67 |
| 4,813,070 | 3/1989 | Humphreys et al. | 379/213 |
| 4,878,239 | 10/1989 | Solomon et al. | 379/67 |
| 4,893,335 | 1/1990 | Fuller et al. | 379/200 |
| 4,926,461 | 5/1990 | Kuok | 379/67 |

FOREIGN PATENT DOCUMENTS

| | | | |
|---|---|---|---|
| 0156058 | 12/1981 | Japan | 379/212 |
| 0203761 | 9/1986 | Japan | 379/212 |
| 0245844 | 10/1987 | Japan | 379/212 |

Primary Examiner—Thomas W. Brown

[57] ABSTRACT

A selective call-forwarding method and apparatus utilizes telephone company facilities whereby a calling party will only be forwarded if a preferred calling code number is entered by the calling party. Upon receipt of a preferred calling code, a detector operates to detect and validate the code. Once the code is detected and validated, the apparatus proceeds to implement a connection to a third phone based on the automatic implementation of telephone company operating procedures to make the connection and, thereby, to selectively connect a preferred calling party to a remote telephone whereby the preferred party can communicate with the subscriber who has the procured service.

9 Claims, 2 Drawing Sheets

APPARATUS AND METHODS FOR SELECTIVELY FORWARDING TELEPHONE CALLS

BACKGROUND OF THE INVENTION

This invention relates to apparatus and methods by which incoming phone calls are forwarded or diverted from a called line to a remote line on a selective pre-screened basis.

The present application includes subject matter which was disclosed in Disclosure Document No. 165897 dated Mar. 11, 1987 and filed pursuant to the United States Patent Office Disclosure Document Program.

This invention deals with selectively linking a caller on an incoming call to another telephone number which has been preprogrammed and which telephone number is under the control of the called line. The technique of forwarding a telephone call to a remote line has been generically designated as call-forwarding. In fact, call-forwarding is available through the telephone company utilizing central office equipment. In employing call-forwarding, the telephone calls are automatically transferred from a subscriber's telephone to whatever number the subscriber wishes these calls to be transferred to. Call-forwarding works as follows.

In order to transfer a call, the subscriber on his telephone dials the numbers 72. He can dial this using a rotary phone or employing a touch-tone phone. He then may access the pound (#) button. The central office will recognize this request and send a dial tone. He then dials the number where the calls are to be transferred. The telephone company acknowledges receipt of the dialed number by sending two beeps. Essentially, this will complete the call-forwarding. To discontinue the transfer, the subscriber then dials the digits 73 and then presses the pound button (#) if there is one on the telephone set. In about four seconds the subscriber will hear two beeps indicating that the transfer is discontinued and the phone is now operating conventionally.

As one can understand from the above, once a subscriber dials a remote location, the telephone company automatically forwards the call to that location. This is done in a rapid manner and all calls coming to the subscriber's location will be automatically forwarded. It is, of course, extremely desirable that one would be able to program the remote calling number or the forwarding number from any telephone location. Such a system has been implemented and described in the prior art.

Reference is made to U.S. Pat. No. 4,670,900 issued on June 2, 1987 to Herbert H. Waldman, the inventor herein, and entitled Single Line Telephone Call-Forwarding Device. This patent describes a device for enabling call-forwarding instructions to be given from any telephone in the system or in any connecting system which needs to be connected only to the phone line to which the call-forwarding service is provided. It does not require another phone line to communicate with the device. The device employs a ring detector to detect a short ring that occurs when a call is forwarded and to detect a long ring that occurs when call-forwarding is not in effect. Upon the detection of one or more short rings, the device seizes the phone line and transmits a 73 signal that cancels call-forwarding and triggers a timer that starts a timing interval of preset duration. If another phone call is received at the device within a preset timing interval, and an authorization code is transmitted within that interval, the device enables the call-forwarding instructions stored in the recorder to be changed. Thereafter the device will transmit the stored call-forwarding instructions to the central station within a given period. Thus, as one can see, the above-described patent enables a subscriber to change the number to which a call is forwarded to any desired telephone number in the system, and this can be done remote from the subscriber's subset.

As one can see from the above, call-forwarding essentially is implemented by the central office of the telephone company and is done so according to a number programmed in by a subscriber.

Another procured service available through the telephone company via the central office is designated as three-way calling. In three-way calling the object is to allow three telephone subsets to be connected together and under the control of a subscriber location having the procured service. In order to add a third telephone to an existing call, the subscriber presses the switch hook (flash) of his set which puts the person connected to on hold. Then there are three quick beeps followed by a dial tone. Upon receipt of the dial tone, the subscriber dials the number of a remote phone that he wishes to also be connected to. The switch hook is then pushed (flash) again and all three phones are connected. To disconnect the third person, the subscriber pushes the switch and he and the original person are now connected again. When the subscriber hangs up, the entire telephone conversation is disconnected.

In regard to three way calling, reference is made to U.S. 4,670,628 issued on June 2, 1987 and entitled Reprogrammable Call-Forwarding Device by James F. Boratgis, et al. This patent shows a call-forwarding device for a forwarding phone that is connected by a single forwarding phone line to a central telephone exchange. The exchange, as indicated, provides the three-way conference service as indicated above. In the call-forwarding mode, in response to a call from a calling phone to the forwarding phone, the device has circuits including a ring detector, a hook condition simulator and a sensor that automatically operates to simulate an off-hook condition to simulate a first switch flash condition and operates to actuate a message transmitting and storage device which generates telephone dialing pulses corresponding to the number of the third phone and to simulate a second hook flash condition whereby the calling phone is automatically connected by the equipment to a third phone. The circuit has remote reprogramming capability so that the device may be reprogrammed with any third phone number to change the telephone number to which the call is forwarded and then reset for receiving the next call or a new phone number.

This patent takes advantage of the three-way calling service provided by the telephone company to utilize the subscriber's phone acting as a connecting interface between a calling party and the called party who is now located at the third phone location.

Further, and in conjunction with three-way calling, is the fact that the storage device, which is a necessary part of utilizing three-way calling to implement call forwarding, has an unlimited memory storage. Hence, a very important aspect of the three-way calling mode is to employ the call screening and privacy to cellular phone users. Hence, as will be explained, calls made to a car phone can be rendered selective as well and hence saves air time charges to the subscriber. In this manner, the subscriber programs the roaming access number remotely into the selective forwarding system, as will be explained. The caller always dials the same telephone number, which is the subscriber's local number regardless of which cellular area the mobile user may be in. A great advantage in this regard is that the subscriber does not in any manner have to disclose his mobile telephone number to anyone by programming his mobile number into his system and thus maintaining the confidentiality of his mobile phone number. In this manner, the caller does not have to know where the subscriber is as the subscriber can automatically dial in his roaming access number which will be stored in the call forwarding equipment and then upon receiving a call and a proper access code the calling party will be connected to the subscriber no matter where the subscriber is located with respect to the cellular equipment. Upon leaving his car, the subscriber can program in a phone number where he is to be at, based on the system operation. The roaming access number can also be changed to therefore enable any caller to contact the subscriber without knowing the location of the subscriber. This is extremely important for use in cellular telephone systems as the roaming problem is a substantial prior art problem.

As one can ascertain, the above services as supplied by the telephone company, require that the serviced subscriber is responsible for all charges which include the connection from his telephone to the remote phone. The telephone subscriber who has taken advantage of call-forwarding or three-way calling pays for all connection charges. In this manner, it is extremely desirable to provide a system whereby the apparatus will selectively link a caller on an incoming call to another phone line which has been programmed into the system. In this manner, the prior art systems are deficient in that every call is forwarded to the predesignated telephone without discriminating between desired and undesired callers. Hence, these systems lack the important element of first screening the calls so that only certain callers will be forwarded and other callers will not be forwarded. The cited systems do not possess the ability to be selective in their call-forwarding function. This is so because the phone number dialed by the caller is processed in the central office forwarding equipment and an incoming call is not first intercepted and screened by the system but is automatically made. In regard to the instant invention, the call, prior to being diverted to its ultimate destination, is first intercepted and screened by the system of the instant invention and if the person making the call is properly authorized then the call is transferred on a selective basis only. Hence, the primary objective of this invention is to provide apparatus whereby one will implement a call-forwarding method that is selective, and hence there is provided apparatus for selectively forwarding telephone calls originated by preferred calling parties. The system can be employed in regard to the services provided by the telephone company, as for example three-way calling and call-forwarding, and can also be provided to implement and enhance other conventional operating systems.

It is a further objective to provide a call forwarding system which can be programmed with more than one telephone number as for example a mobile telephone number as well as a roaming access number or either.

It is an additional object to provide a call forwarding system which can be controlled to operate selectively or non-selectively.

It is another object to provide a simulated ringing or busy signal until a calling party provides a preferred code.

It is a further object to enable a subscriber to maintain telephone numbers or his mobile number in confidence.

SUMMARY OF THE INVENTION

In a single telephone line call-forwarding apparatus including a subscriber subset associated with a procured telephone company service having coupled thereto a telephone line connected to central office equipment with said subscriber subset coupled to an automatic answering and storage apparatus operative to enable a calling party to be connected to said subscriber subset via said central office equipment, with said answering and storing apparatus operative to detect ringing to answer said call by said calling party and to enable said central office to provide a connection between said calling party and said subscriber subset and to thereafter cause said central office to connect said calling party to a remote third telephone line, the improvement therewith comprising means coupled to said answering and storage apparatus to provide a control signal upon detection of ringing and a preferred calling code detector means responsive to said control signal and adapted to decode a preferred calling code signal dialed by said calling party to provide at an output an indication that said signal is authorized to enable said answering and storage apparatus to permit said connection to an authorized third telephone subset, whereby if the preferred code is not provided said connection to said third telephone line will not be made.

DETAILED DESCRIPTION OF THE FIGURES

Before proceeding with a detailed description of the figures, its is indicated that many of the components utilized and described in the figures are conventional and are available as can be seen from the above-cited patents.

Furthermore, most of the structure and hardware, as will be explained, is conventionally available and can be implemented by means of existing hardware and software.

A main aspect of the invention is the utilization of an answering device which contains storage such as tape storage, electronic storage and so on. Such answering machines operate to detect ringing, cause the monitored telephone line to go off-hook and play a message to the calling party and operate thereafter to receive a message from the calling party. This message is stored on tape or in memory and can include telephone numbers as dual tone multi-frequency (DTMF) dial pulses and so on. Basically such answering and storage devices can transmit stored messages or stored telephone numbers to the telephone line, receive messages or telephone numbers to be stored at the device and can be automatically operated to do so under the control of suitable timing and logic circuits. Such answering machines are widely employed and available in the prior art and, as will be explained, constitute an important component of the present invention.

Figure 1:
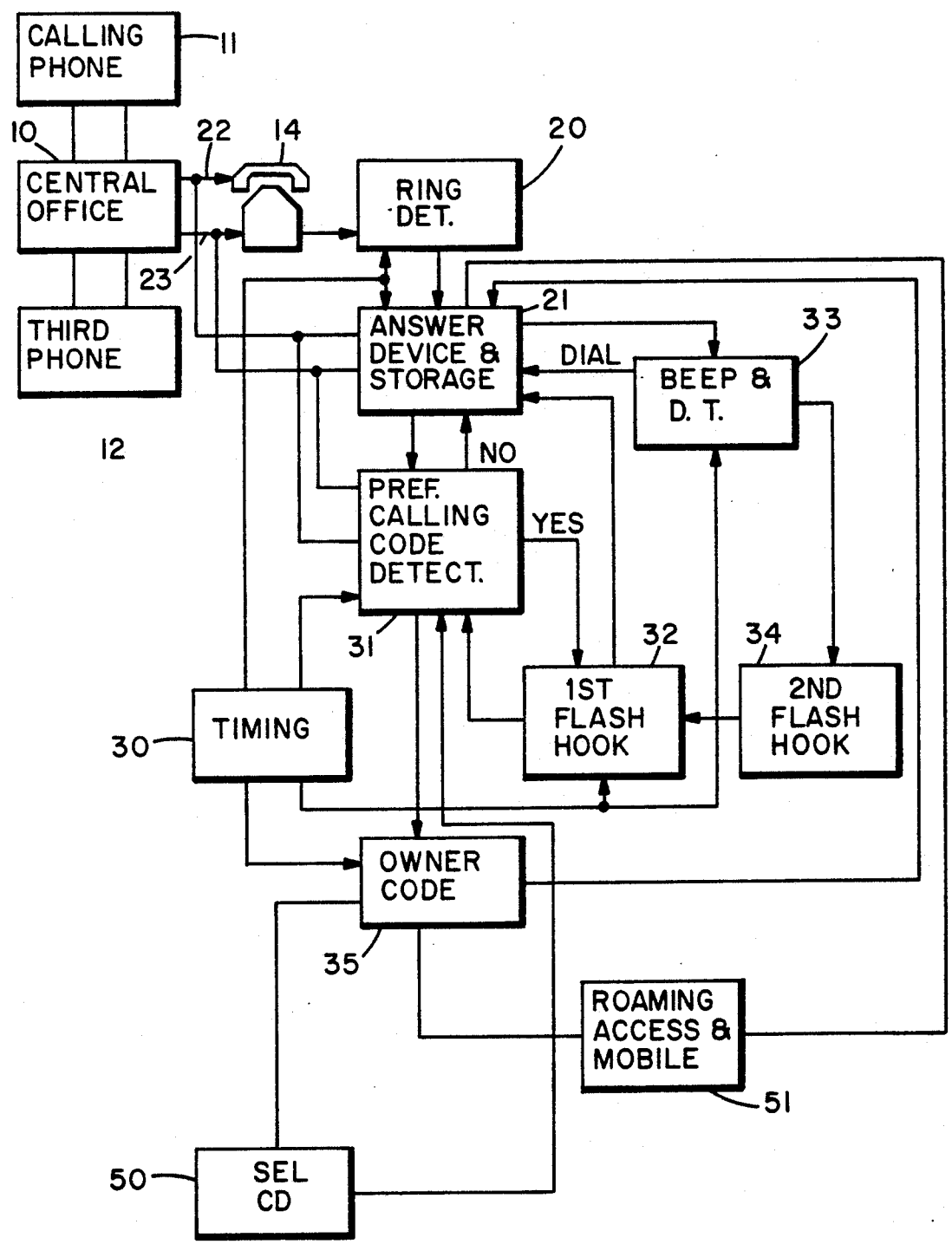
FIG. 1 is a block diagram showing a selective call-forwarding system employing three-way calling technique.

Referring to FIG. 1, there is shown a block diagram of a selective call-forwarding system according to this invention employing the telephone company three-way calling scheme, as for example the type depicted and shown in U.S. Pat. No. 4,670,628 as above indicated.

As seen in FIG. 1, the central office which is associated with and operated by the telephone company provides the telephone line (two wires) to the subscriber 14 who is a typical telephone subscriber. The central office 10, of course, has the ability to connect calling phones as 11 to the subscriber phone 14 and thereafter, by means of the three-way calling procured service, make a connection between the calling phone 11, the subscriber phone 14 and a third phone 12.

As indicated above, in order to make such a connection, one simply pushes the switch hook of telephone 14 or momentarily depresses the cradle button. In implementing this action the calling party 11 is put on hold. The central office supplies three quick beeps followed by a dial tone. Upon receipt of the dial tone, the subscriber, via the telephone 14 can dial in the number of the third phone 12, and therefore the central office will make a connection between phones 11, 14 and 12. Once the number is dialed by pushing the switch hook again, all three phones can participate in conversation. It is, of course, understood that phone 14 can be used as a relay whereby the person who is the subscriber to phone 14 can now answer calls at the third phone 12.

As seen, one technique of providing the procedure automatically is described in the above-noted '628 patent. According to the present invention and in order to use the service, the calling phone 11 or calling party must be a preferred party. In this manner, the calling party is furnished with a preferred calling code which code is supplied to this party by the subscriber 14. As will be explained, if the calling party does not have this preferred code number then the system will not connect to the remote third phone 12 but will merely operate to take a message from the calling party as will be further described.

The system operation is as follows. Assume that the calling phone 11 dials and can be connected to phone 14. The central office then transmits the ringing signal. The ring detector 20 which is a conventional component and may be part and parcel of the answer device and storage module 21 detects the ringing and initiates an off-hook by shorting the hook switch of line 14. This is essentially typical of conventional answering machine operation, and, of course, as understood, the ring detector 20 and a line seizure device (relay) are included within the answering machine 21 apparatus.

The answering machine now is connected on line and proceeds to transmit the following recorded message or a message similar thereto. The message will state "Subscriber 14 is not available. If you are a preferred caller, please dial in your preferred calling code." In this manner, once this message is transmitted, the answering device and storage 21 will expect a response—namely, the dialing by the caller of a preferred code. Alternatively, instead of transmitting a message, a simulated ringing signal or simulated busy signal can be sent or another tone signal recognized by the preferred caller. This will cause the preferred caller to dial in the preferred number. A timing module 30 is implemented to start at predetermined times with one timing interval of a suitably sufficient duration to allow the calling party 11 to dial his preferred code. As seen, coupled to the telephone lines 22 and 23 is a preferred calling code detector module 31. The preferred calling code detector module is a decoder which can decode DTMF tones indicative of a preferred calling code. The calling party, if he is a preferred caller, will have a number which is in his sole possession and which number can be decoded by the code detector 31 and compared to determine whether this is a valid system code.

Thus, the dialed code number, as stored in the code detector 31, is compared with permissible numbers. If it is a correct number then the preferred calling detector provides a control signal output indicative of a YES or a high indicating that an authorized code has been received. The timer then commences a new timing cycle by which the first flash hook module 32 operates to shunt the switch hook to simulate the first requirement of a third party call. After the first flash hook occurs, the system now, by means of dial detector 33, detects dial tone. The detector 33 is designated as a beep and dial tone detector. As indicated, prior to sending dial tone the telephone company sends three short beeps. These can be detected as well for further reliability. Dial tone detectors 33 are well known in the state of the art. In any event, upon detecting of dial tone, the dial tone detector sends a signal to the answer device and storage 21 which causes the number of the third phone 12 as stored in memory to be dialed over the telephone line. The telephone company automatically connects the third phone 12 to the calling phone 11 and to subscriber phone 14 based on the three-way calling procedure. The switch hook is then shunted again by means of a second flash hook module 34. The first flash hook module 32 and the second flash hook module 34 may be the same circuit component but have been shown separately for ease of explanation. It is understood that in order to provide a flash hook or a simulation of a flash hook one merely needs a relay in series with the telephone line to indicate a momentary on-hook condition of proper duration. This is well known and many examples of such relay circuits or other circuits are shown in the above-noted patents.

Hence, as one can ascertain, the only way the connection can be made is by having the calling phone 11 or the subscriber thereto dial in his preferred calling code. If the preferred calling code is not dialed in or if the preferred calling code is incorrect then the code detector will provide a control signal indicative of a NO. This signal is sent to the answer device and storage module 21 which will then transmit a message along the following lines: "You have not dialed in your number." or "Your number as dialed is incorrect. Therefore, upon the sound of the tone, please leave a message and Mr. Subscriber 14 will get back to you."

Hence, as one can ascertain, the above-described system enables only those parties having a preferred calling code to be connected to the third phone 12. In a similar manner, it is, of course, understood that the owner or subscriber 14 can change the number of the third phone at will. These reprogramming techniques are known in the art and can be implemented very simply.

As shown in FIG. 1, the owner will have his own code which will be recognized by the owner code detector as an owner code as further evidenced by module 35. Upon detection of the owner code, the module 35 accesses the answering device and storage module 21. Access of the answering device and storage module 21 by the owner code detector operates to place the device 21 in the memory mode. This can be implemented by the owner to further dial on owner code. Once the answering and storage 21 is placed in the memory mode, the owner now dials in a number indicative of a third telephone number 12. A given timing sequence implemented by the timing module 30 supervises this mode and the subscriber phone 14 is automatically placed back on hook by the system after a telephone number change and hence can again receive calls. The subscriber 14 as indicated can dial in his roaming number or mobile number or both and store such a combination in the storage 21 to thereby allow preferred callers having a proper calling code to connect to his mobile phone in any desired area and without requiring the caller to determine the proper roaming access code.

In the procured service of three-way calling, as provided by the telephone company, one can dial in a composite telephone number, such as a roaming number, as required for mobile transmission, and a mobile telephone number. In the three-way system there is no limitation on the number of digits that can be dialed by the answer device and storage device 21. This, for example, is compared to the procured service of call forwarding. In the procured service of call forwarding one can only dial in a conventional single telephone number and nothing more because this number is the number stored at the telephone company and is not stored locally, as will be understood.

In any event, using three-way system, as shown in FIG. 1, enables great advantages regarding a mobile telephone subscriber who is associated with the phone 14. The roaming access number, for example, can be bypassed for an office phone number when the subscriber desires to do so. The equipment for doing so can be simply associated with the owner code module 35 and incorporated in a roaming access and mobile module 51. In this manner, the system can automatically be programmed by the owner to insert, for example, an office phone number or a different roaming access number when he is out of the area or by merely sending a particular code after sending the owner code he can then cancel the roaming access number or office number without cancelling the mobile telephone number. In this manner the mobile telephone number can be permanently programmed into the system so that only the roaming access number has to be changed remotely.

The module 51 basically can include a first memory location for storing a roaming access number and a second memory location for storing a mobile number. Both the roaming access number and the mobile number can be selectively temporarily bypassed by insertion of a code such as # sign following the owner code and then dialing in an office or land line number. To reinstate the roaming access and mobile number, the owner again dials his code and enters, for example, a star (*) key following the owner's code. This operation can be accommodated by module 51 as operating in conjunction with module 35. It is understood that module 51 and control can be part of and included in module 21. Memory mapping techniques for allocating or assigning memory space for different storage functions is known in the art.

A great advantage of the present system is that the user 14 does not in any manner have to give out a mobile telephone number to anyone but this number can be programmed into the system by the owner.

As indicated above, the owner, via his owner code, which is detected by the owner code detector as evidenced by module 35, dials in an owner code which will enable him to automatically reprogram the storage device, such as to change his roaming access number or to change the telephone number from an office number to a mobile number and so on.

The roaming access number is a ten digit number and hence is difficult to dial and difficult to remember. In this system a given number of such roaming access numbers are stored in memory. Each number stored is indicative of a given area defined by a roaming access number. For example, New York City, Washington, D.C., Philadelphia and so on. The subscriber, instead of dialing in the 10 digit number, dials in a two digit number as N.Y. or 69 for New York City or DC (23) for Washington. The dialing of these digits accesses the memory to cause the proper 10 digit number indicative of the true roaming access number to be dialed by the system. This substantially reduces the dialing time for the subscriber, reduces errors and decreases connection costs. In a similar one can also use the procured speed dialing service provided by phone companies to speed the dialing process from the answering and storage device. In this way the answering and storage device after seizing the telephone line will dial the proper sequence to access speed dialing and thereafter dial the appropriate code for the desired preprogrammed forwarding number.

Also shown coupled to the owner code detector 35 is a selective code detector 50. The function of the code detector 50 is that once the owner code is recognized by a module 35 the owner can now change stored telephone numbers, as above indicated. The owner, by then dialing in another preselected code, can operate the selectivity code detector 50 to eliminate the preferred calling mode of operation. In this manner, the telephone system will operate so that any caller will be transferred by means of the three-way calling or can be again operated so that no caller will be transferred but the system will be a typical answering machine system.

Hence, by means of the selectivity code detector 50 one can implement selection of preferred calling to enable only those having a preferred calling code to be connected to a remote location or the complete disabling of preferred calling to enable anyone who calls to be connected to a remote location or the complete disabling of any call forwarding to therefore allow the system to simply operate in conjunction with the answering machine.

Thus, as one can see, one can utilize the procured service of three-way calling by assuring that only selective callers having preferred calling codes will be connected to the third phone upon dialing in an authorized calling code. It is, of course, understood that if the answering device and storage device 21 employs a magnetic tape one can dial DTMF signals directly to be stored on the tape. It is also easily understood that one can implement rotary dialing to allow storage of numbers. One can use electronic memory in lieu of tape and hence convert DTMF to digital signals which are stored. Such techniques are well known in the art.

As one can understand from the above, the system described results in substantial savings for the subscriber 14 who is now assured that only authorized persons will be connected. Those persons, who do not have a preferred calling code, will not be connected.

Furthermore, the charges associated with cellular systems are extremely high and this system enables one to avoid many of these charges which would otherwise occur. For example, if the subscriber 14 has a mobile phone such cellular systems provide call forwarding, but the subscriber is charged at normal cellular rates or usage charges. With this system when the subscriber leaves his car he then calls in to program in a land number where he can be reached. Thereafter calls are forwarded to the land number thus bypassing the cellular system entirely and only normal land line phone charges will apply.

Figure 2:
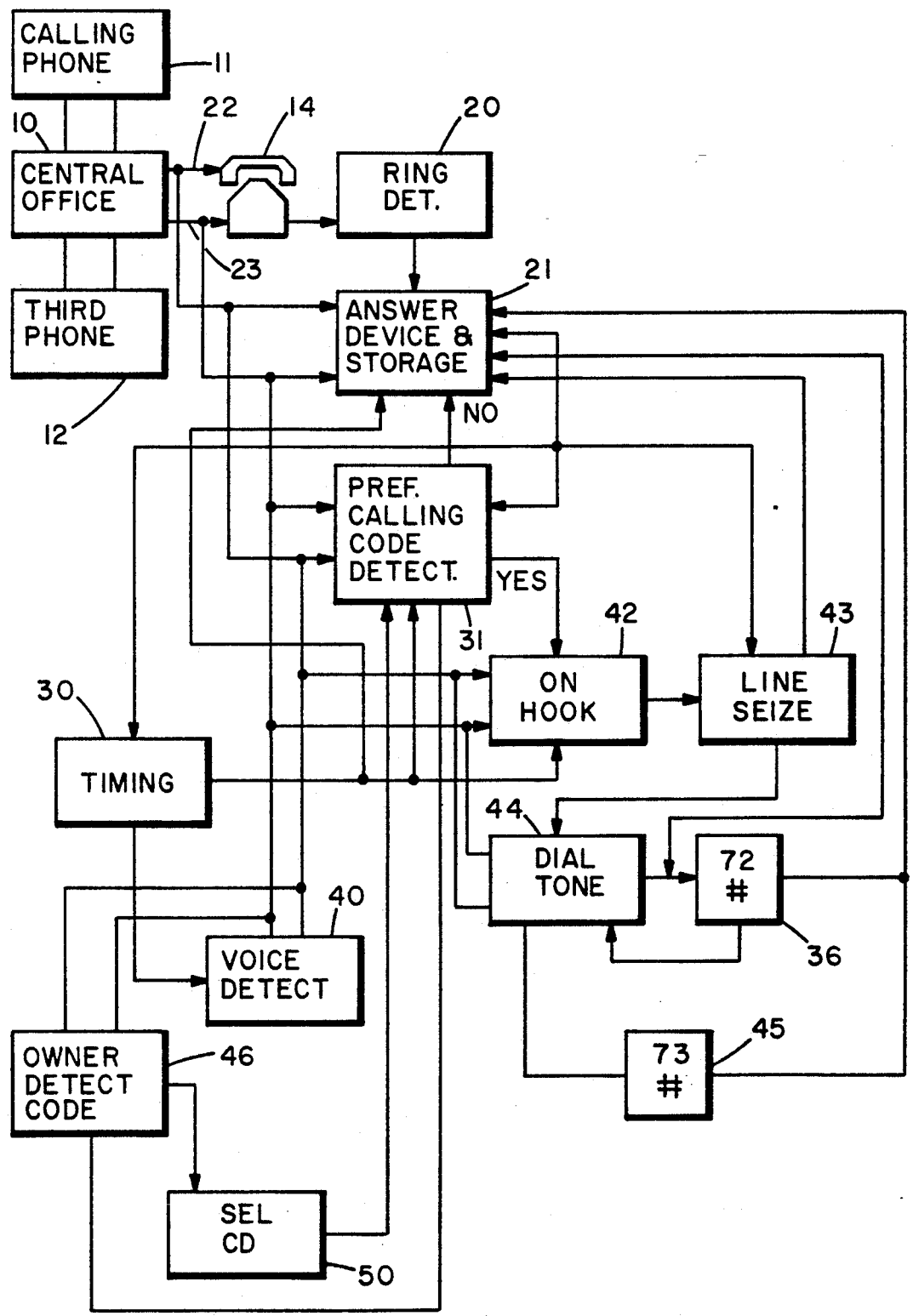
FIG. 2 is a block diagram showing a selective call-forwarding system employing a central office call-forwarding procedure.

Referring to FIG. 2, there is shown a block diagram of the subscriber 14 as connected to the central office 10 where the subscriber is associated with the procured call-forwarding service of the telephone company. The block diagram of FIG. 2 shows the implementation of a connection to subscriber, as will be explained.

It is noted that many of the circuit components in FIG. 2 have received the same reference numerals as those in FIG. 1 due to the fact that they essentially function in a similar manner. For purposes of explanation, assume that the phone 14 can now be conventionally accessed as call forwarding has been intentionally eliminated. In this manner, the calling phone 11 now dials the number to connect to phone 14 and a connection is made via the central office 10. The ring detector 20 again detects ringing and operates the answer and storage device 21 to transmit a message on the telephone line briefly as follows. "Mr. Subscriber 14 is not in. Please enter your preferred calling code." If the caller is a preferred caller, he will enter the code which again will be decoded by the preferred calling code detector 31. If the code is a valid code, the following sequence of events will occur. The preferred calling code detector 31 immediately advises the answer and storage device module 21 that the code as detected is correct. The answering and storage module 21 then transmits the following or a similar message back to the calling party 11. "You have entered a valid code. Please hang up and wait approximately 30 seconds and call back to complete a call to subscriber 14." Thus, based on this, the calling phone 11 will hang up. The on-hook module 42 will cause subscriber set 14 to hang up by opening the line for a required interval. After the interval, a line-seize relay 43 is actuated whereby the telephone line is now seized and a dial tone is received which may be detected by means of the dial tone detector 44. Upon receipt of a dial tone, the dial tone detector immediately activates module 36 which automatically causes the digits 72 plus the pound digit to be sent to the line. This code is detected by the central office where the central office now returns a dial tone. The dial tone detector 44 again responds to the dial tone now causing the answer and storage device 21 to dial the telephone number indicative of the third phone 12.

This, of course, will be the number to which calls are transferred. The telephone company via the central office detects the dialed number and stores this. After the dialed number has been dialed one or more times by means of the answer and storage device 21, the subscriber line 14 is again placed in the on-hook condition. Hence, if the calling party 11 makes the call within the 30 second period, he will automatically be connected to the third phone 12 as desired. After the telephone conversation is terminated the calling phone 11 hangs up, a voice detector 40 will recognize that there is no activity on the phone line.

Voice detector 40 under control of the timing module 30 will then cause the telephone line associated with subscriber 14 to go into the on-hook state by means of on-hook module 92. Once the on-hook module 42 activates, module 43 again seizes the line. Dial tone detector 44 detects dial tone and module 45 now causes device 21 to dial the digits 73 pound which are received by the central office and which automatically cancels call forwarding.

As one can ascertain, the entire process proceeds each and every time a preferred calling party accesses the equipment and a correct preferred calling code is implemented by the system. Again, if the calling code is not dialed or is not a valid code then the preferred calling code detector will not authorize the code. If the code is not detected or authorized, then this is indicated as a "no" and the answer and storage device 21 now transmits the following message: "You are not an authorized caller. Please leave a message and subscriber 14 will get back to you." The apparatus of FIG. 2 also has the provision of enabling the subscriber 14 to remotely program a phone number 12 on a selective basis and as described for example in conjunction with the above-noted patent, U.S. Pat. No. 4,670,900.

In this manner, the owner has an owner code which is detected by the preferred calling code detectors as further evidenced by module 46. Thus, by the owner dialing in his particular code, one can now implement the reprogramming feature completely as shown in U.S. Pat. No. 4,670,900. The selective code detector 50 operates identically to that described in FIG. 1 and allows the owner to select preferred calling, or to allow any caller to be forwarded or to prevent forwarding entirely and simply use the answer machine. FIG. 2 depicts selective call-forwarding which can only occur when a calling party via a calling phone 11 has an assigned correct preferred calling code which has been assigned to that party by the subscriber 14. In this manner, the subscriber 14 can eliminate nuisance calls and, therefore, save a great deal of money and time.

It is, of course, understood that the above-noted block diagrams are general in nature, however all of the features and functions included in both of the systems of FIG. 1 and FIG. 2 have been described in the prior art with the exception of the preferred calling code detector which detector can be implemented by many well known decoding techniques. The events and logical operations of both systems of FIGS. 1 and 2 have been described in adequate detail, and one skilled in the art should envision many alternate embodiments.

I claim:

1. A method of providing selective call-forwarding from a calling line via a called subscriber line, said called subscriber line having a procured telephone company service to thereafter connect said calling line via said called line to a third telephone line via said procured service, said called subscriber line further connected to an automatic answering and storage apparatus operative to detect ringing of said line to go off-hook and connect to said calling line, comprising the steps of:

placing a first message on said connected line requesting a caller on said calling line to enter an authorization code, and, responding to said authorization code to determine if same is a subscriber owner code, and, upon determination that said authorization code is a valid subscriber owner code, accessing said automatic answering and storage apparatus to cause the same to receive programming data indicative of a different third telephone line, or;

upon determination that said authorization code is not a subscriber owner code, responding to said authorization code to determine if said authorization code is a valid preferred-caller forward authorization code, and, upon determination that said authorization code is a valid preferred-caller forwarding authorization code, making connection to said third telephone line via said procured service as controlled by said automatic answering and storage apparatus, or;

if said authorization code is not validated in either alternative step above described, placing a second message on said connected called line requesting said calling line party to leave an incoming message on said automatic answering and storage apparatus, and storing said incoming 2. A method of providing selective call-forwarding from a calling line via a called subscriber line, said called subscriber line having a procured telephone company service to thereafter connect said calling line via said called line to a third telephone line via said procured service, said called subscriber line further connected to an automatic answering and storage apparatus operative to detect ringing of said line to go off-hook and connect to said calling line, wherein a caller possessing a preferred-caller forwarding authorization code may elect to be either forwarded to said third telephone line or, alternatively, to record a message on said automatic answering and storage apparatus, comprising the steps of:

placing a first message on said connected line requesting a caller on said calling line to enter an authorization code, and, responding to said authorization code to determine if same is a subscriber owner code, and, upon determination that said authorization code is a valid subscriber owner code, accessing said automatic answering and storage apparatus to cause the same to receive programming data indicative of a different third telephone line, or;

upon determination that said authorization code is not a subscriber owner code, responding to said authorization code to determine if said authorization code is a valid preferred-caller forwarding authorization code and, upon determination that said authorization code is a valid preferred-caller forwarding authorization code, making connection to said third telephone line via said procured service as controlled by said automatic answering and storage apparatus, or;

if said authorization code is not validated in either alternative step above described, storing an incoming message on said automatic answering and storage apparatus.

3. A method of providing selective call-forwarding from a calling line via a called subscriber line, said called subscriber line having a procured telephone company service to thereafter connect said calling line via said called line to a third telephone line via said procured service, said called subscriber line further connected to an automatic answering and storage apparatus operative to detect ringing of said line to go off-hook and connect to said calling line, wherein a caller possessing a preferred-caller forwarding authorization code may elect to be either forwarded to said third telephone line or, alternatively, to record a message on said automatic answering and storage apparatus, comprising the steps of:

responding to an authorization code on said connected line to determine if same is a subscriber owner code, and, upon determination that said authorization code is a valid subscriber owner code, accessing said automatic answering and storage apparatus to cause the same to receive programming data indicative of a different third telephone line, or;

upon determination that said authorization code is not a subscriber owner code, responding to said authorization code to determine if said authorization code is valid preferred-caller forwarding authorization code and, upon determination that said authorization code is a valid preferred-caller forwarding authorization code, making connection to said third telephone line via said procured service as controlled by said automatic answering and storage apparatus, or;

if said authorization code is not validated in either alternative step above described, storing an incoming message on said automatic answering and storage apparatus.

4. A method of providing selective call-forwarding from a calling line via a called subscriber line, said called subscriber line having a procured telephone company service to thereafter connect said calling line via said called line to a third telephone line via said procured service, said called subscriber line further connected to an automatic answering and storage apparatus operative to detect ringing of said line to go off-hook and connect to said calling line, comprising the steps of:

placing a first message on said connected line requesting a caller on said calling line to enter an authorization code, and, responding to said authorization code to determine if same is a preferred-caller forwarding authorization owner code, and upon determination that said authorization code is a valid preferred-caller forwarding authorization code, making connection to said third telephone line via said procured service as controlled by said automatic answering and storage apparatus, or;

upon determination that said authorization code is not a preferred-caller forwarding authorization code, responding to said authorization code to determine if said authorization code is a valid subscriber owner code, and, upon determination that said authorization code is a valid subscriber owner code, accessing said automatic answering and storage apparatus to cause the same to receive programming data indicative of a different third telephone line, or;

if said authorization code is not validated in either alternative step above described, placing a second message on said connected called line requesting said calling line party to leave an incoming message on said automatic answering and storage apparatus, and storing said incoming message on said automatic answering and storage apparatus.

5. A method of providing selective call-forwarding from a calling line via a called subscriber line, said called subscriber line having a procured telephone company service to thereafter connect said calling line via said called line to a third telephone line via said procured service, said called subscriber line further connected to an automatic answering and storage apparatus operative to detect ringing of said line to go off-hook and connect to said calling line, wherein a caller possessing a preferred-caller forwarding authorization code may elect to be either forwarded to said third telephone line or, alternatively, to record a message on said automatic answering and storage apparatus, comprising the steps of:

placing a first message on said connected line requesting a caller on said calling line to enter an authorization code, and responding to said authorization code to determine if same is a preferred-caller forwarding authorization code, and, upon determination that said authorization code is a valid preferred-caller forwarding authorization code, making connection to said third telephone line via said procured service as controlled by said automatic answering and storage apparatus, or;

upon determination that said authorization code is not a preferred-caller forwarding authorization, responding to said authorization code to determine if said authorization code is a valid subscriber owner code, and, upon determination that said authorization code is a valid subscriber owner code, accessing said automatic answering and storage apparatus to cause the same to receive programming data indicative of a different third telephone line, or;

if said authorization code is not validated in either alternative step above described, storing an incoming message on said automatic answering and storage apparatus.

6. A method of providing selective call-forwarding from a calling line via a called subscriber line, said called subscriber line having a procured telephone company service to thereafter connect said calling line via said called line to a third telephone line via said procured service, said called subscriber line further connected to an automatic answering and storage apparatus operative to detect ringing of said line to go off-hook and connect to said calling line, wherein a caller possessing a preferred-caller forwarding authorization code may elect to be either forwarded to said third telephone line or, alternatively, to record a message on said automatic answering and storage apparatus, comprising the steps of:

responding to an authorization code on said connected line to determine if same is a preferred-caller forwarding authorization code, and, upon determination that said authorization code is a valid preferred-caller forwarding authorization code, making connection to said third telephone line via said procured service as controlled by said automatic answering and storage apparatus, or;

upon determination that said authorization code is not a preferred-caller forwarding authorization code, responding to said authorization code to determine if said authorization code is a valid subscriber owner code end.

upon determination that said authorization code is a valid subscriber owner code, accessing said automatic answering and storage apparatus to cause the same to receive programming data indicative of a different third telephone line, or;

if said authorization code is not validated in either alternative step above described, storing an incoming message on said automatic answering and storage apparatus.

7. The method according to claim 1, 2, 3, 4, 5, or 6 wherein said procured service is a telephone company 3-way-calling service, and wherein, when said call-forwarding is effected, said called subscriber line acts as the connecting interface between said calling line and said third telephone line throughout the full duration of the forwarding connection.

8. The method according to claim 1, 2, 3, 4, 5, or 6 wherein said procured service is a telephone company call-forwarding service, and wherein, when said call-forwarding is to be effected, said connection via said procured service is effected comprising the steps of:

the caller on said calling line disconnecting from said called subscriber line, with said apparatus detecting said disconnection, said automatic answering and storage apparatus disconnecting from said called subscriber line, said automatic answering and storage apparatus reconnecting to said called subscriber line and simulating the programming and activation protocols of said procured service, including the initiation of the timing of a given time period and including a subsequent second disconnection from said called subscriber line, after which said second disconnection and during which said given time period the caller on said calling line may effect a second subsequent call to said called subscriber line and be forwarded to said third telephone line via said procured service without further intercession via said called subscriber line, and upon the elapse of said given time period, said automatic answering and storage apparatus reconnecting to said called subscriber line and simulating the deactivation protocol of said procured service.

9. A method wherein automated forwarding of a telephone call can be effected on a temporary basis by a caller to a called subscriber line associated with a telephone company call-forwarding procured service, said procured service operative when programmed and activated to effect connection to a subscriber-selected third telephone line number, said called subscriber line further associated with apparatus operative for automatic answering and subsequent detection of disconnection by a calling line, said apparatus further operative for storing said subscriber-selected third telephone line number, said apparatus further operative for simulation of protocols to deactivate, activate, and program said procured service with said stored number, said apparatus further operative for determining the elapse of a given time period, said method comprising the steps of:

said caller disconnecting said calling line, with said apparatus detecting said disconnection, said apparatus disconnecting from said called subscriber line, said apparatus reconnecting to said called subscriber line and simulating said protocols to effect the activation and programming of said procured service with said stored number, including the initiation of the timing of said given time period and including a subsequent second disconnection from said called subscriber line, after which said second disconnection and during which said given time period a caller may effect a subsequent call to said called subscriber line and be forwarded to said third telephone line via said procured service without further intercession by said apparatus, and upon the elapse of said given time period, said apparatus reconnecting to said called subscriber line and simulating said protocols to effect the deactivation of said procured service.

* * * * *